F. C. WARNE.
CULTIVATOR.
APPLICATION FILED OCT. 1, 1914.

1,150,158.

Patented Aug. 17, 1915.
2 SHEETS—SHEET 1.

Inventor
FREDERICK C. WARNE.

Witnesses

By
Attorney

F. C. WARNE.
CULTIVATOR.
APPLICATION FILED OCT. 1, 1914.

1,150,158.

Patented Aug. 17, 1915.
2 SHEETS—SHEET 2.

Witnesses
A. D. Schrader
F. C. Adams

Inventor
FREDERICK C. WARNE
By Fred E. Dillman
Attorney

COLUMBIA PLANOGRAPH CO., WASHINGTON, D. C.

UNITED STATES PATENT OFFICE.

FREDERICK C. WARNE, OF MANSFIELD, OHIO, ASSIGNOR TO THE RODERICK LEAN MANUFACTURING COMPANY, OF MANSFIELD, OHIO, A CORPORATION OF NEW JERSEY.

CULTIVATOR.

1,150,158.  Specification of Letters Patent.  Patented Aug. 17, 1915.

Application filed October 1, 1914. Serial No. 864,377.

*To all whom it may concern:*

Be it known that I, FREDERICK C. WARNE, a citizen of the United States, residing at Mansfield, in the county of Richland and State of Ohio, have invented certain new and useful Improvements in Cultivators, of which the following is a specification.

My invention relates to improvements in cultivators, and more particularly to that class or type known as "riding cultivators."

The primary object of this invention is to provide means whereby the shovel or cultivator gangs may be raised or lowered independently of each other through the medium of independent gang actuating levers, or may be raised and lowered simultaneously through the medium of a master lever connected to a rock shaft connected to and adapted to simultaneously actuate said independent or gang actuating levers.

A further object is to provide means for assisting in the simultaneous raising or elevation of the gangs through the medium of the master lever and rock shaft by utilizing the weight of the rider or operator in the seat through the medium of a seat beam which is transformed into a rocking or tilting seat lever connected to one side of said rock shaft and thereby to a degree counterbalancing the weight of the gangs when the latter are elevated through the medium of said master lever and rock shaft, thus permitting of the elevation of the gangs by the master lever with the one hand of the operator and enabling the team to be controlled by the other.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
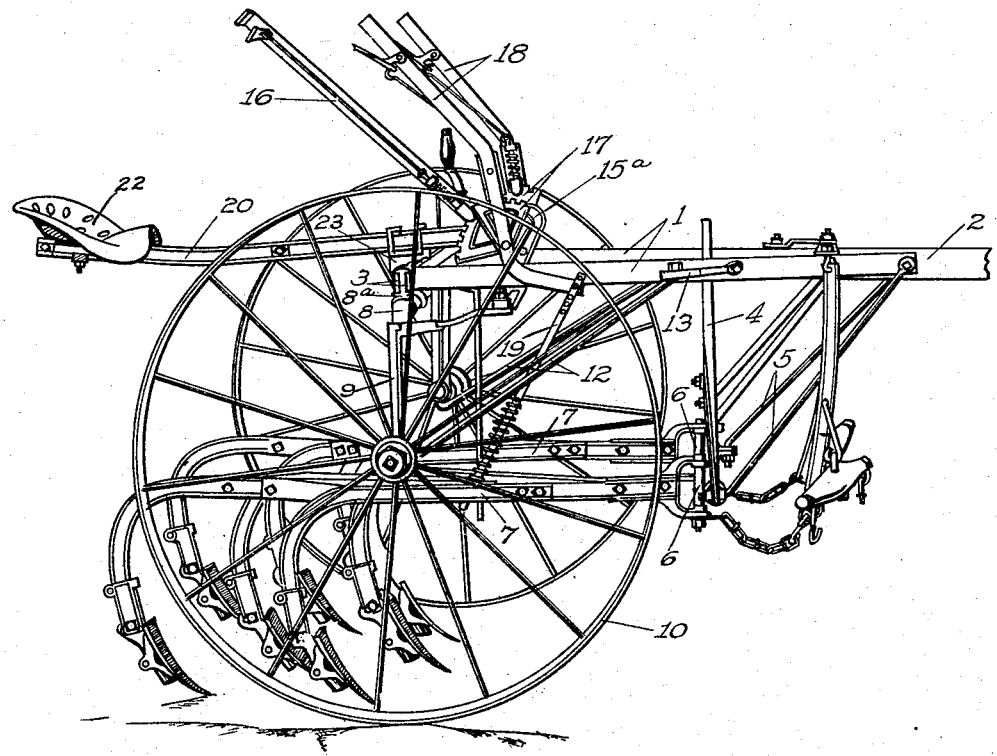
Figure 2:
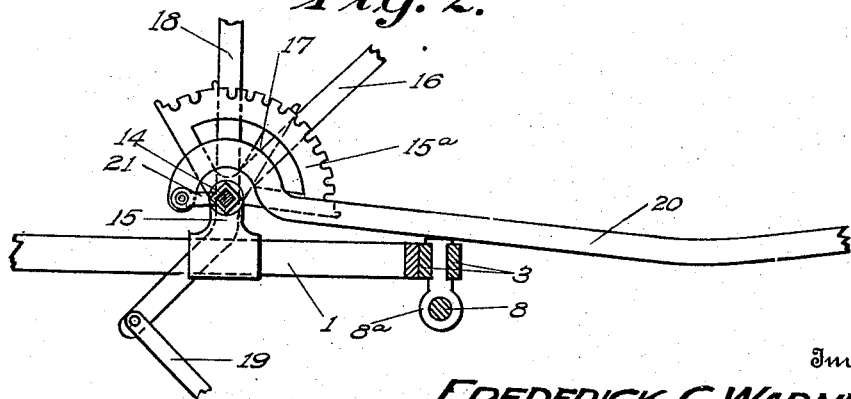
Figure 3:
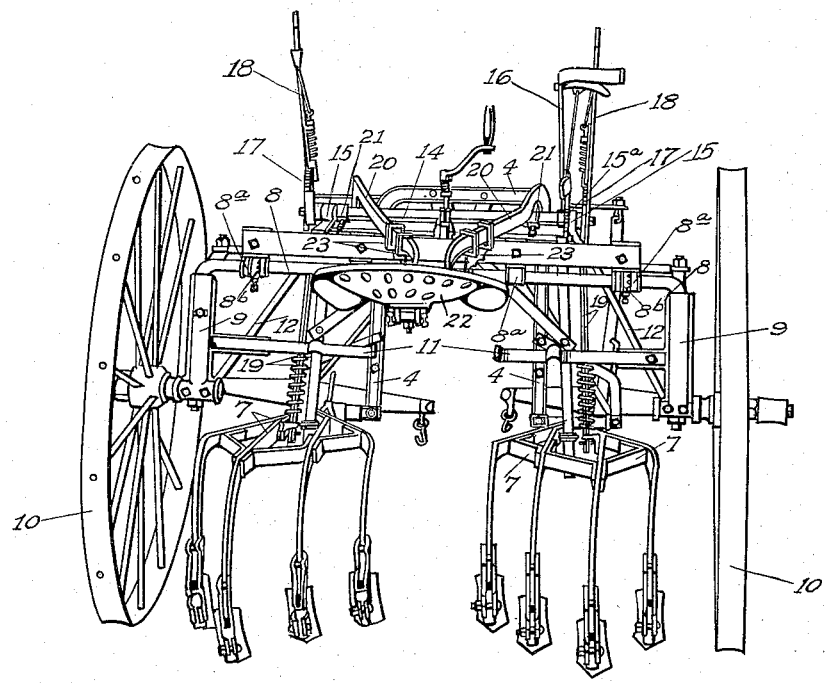
Figure 4:
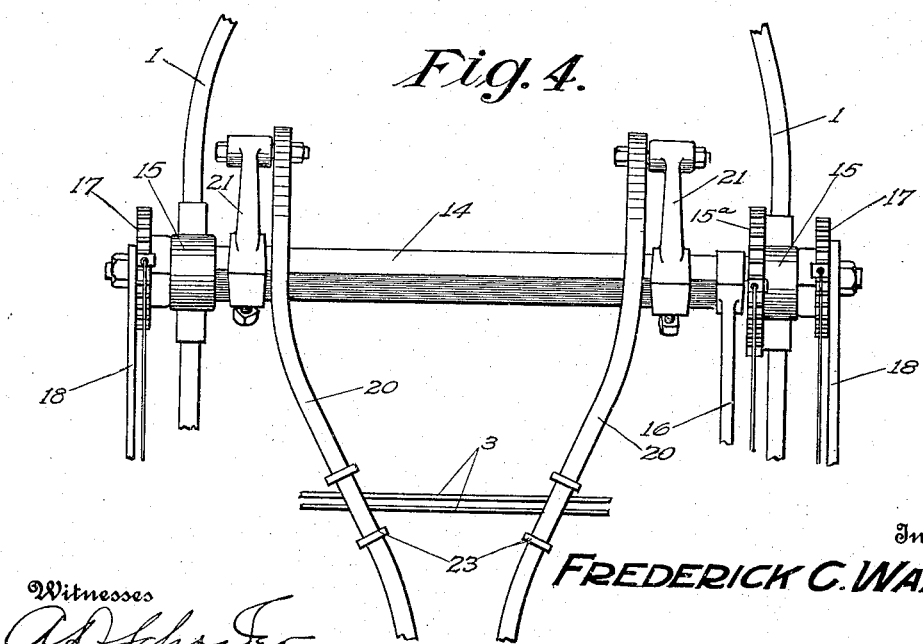

Referring to the drawings, forming a part of this specification, Figure 1, is a perspective view of a cultivator embodying my improvements. Fig. 2, an enlarged longitudinal vertical sectional view of the upper rear portion of the cultivator frame and the transversely extending rock shaft carried thereby, the master and the independent gang lever or beam connected to and adapted to move with said rock shaft, being shown in side elevation. Fig. 3, a perspective view of the cultivator looking from the rear thereof. Fig. 4, an enlarged detail top plan view of the rock shaft and actuating lever mechanism shown in side elevation in Fig. 2.

Similar numerals of reference designate like parts throughout all the figures of the drawings.

While I have shown my improvements applied to or embodied in a riding cultivator of a specific form or type, it will be obvious from the disclosure and explanation herein made that such improvements are not in any way limited or restricted to cultivators of a specific form or type but are applicable for use in connection with cultivators of any suitable and convenient form.

The particular form or embodiment of cultivator shown in the accompanying drawings comprises a suitable cultivator frame consisting of side members 1, secured at their forward ends to the pole 2, and the rear ends to the transversely extending axle supporting members 3.

The gang arch 4, is rigidly attached to the side members 1, of the frame and the depending sides of the arch 4, are suitably braced by means of brace members 5. To the rear ends of the side members of the arch are secured the gang couplings 6, connected to the shovel or cultivator gangs 7. The axles 8, are adjustably mounted beneath the axle frame members 3, through the medium of the bearing sleeves $8^a$, and the adjusting collars $8^b$. The axle pivot sleeves 9, are mounted upon the vertical portions of the axles 8, and carry the ground wheel 10, of the cultivator the latter being adapted to be moved on their pivots through the medium of foot levers 11, secured to the pivot sleeves 9. The axles 8, may be braced through the medium of axle braces 12, pivotally connected to the lower ends of the axle pivot sleeves 9, and extending forwardly and secured to brackets 13, on the side member 1, of the cultivator frame. As the specific details of the cultivator form no part of the present invention and may be varied to meet the varying demands of actual service, the general construction of the cultivator proper need not be further described in detail.

As a means of raising and lowering the cultivator gangs independently of each other as well as also providing means whereby said gangs may be raised and lowered simultaneously a rock shaft 14, is provided, said rock shaft being transversely mounted upon the side members 1, of the frame through the medium of suitable bearings 15, one of said bearings, in the present instance, being provided with a stationary ratchet segment 15ª, to coöperate with a master lever 16, mounted on and fixed to the rock shaft 14, whereby the latter may be secured in any desired position when operated by the master lever 16. The ends of the rock shaft 14, are provided with ratchet segments 17, adapted to be carried by and to be rocked simultaneously with the rocking movements of the rock shaft 14, and as a means for providing for the independent movements of the cultivator gangs, the gang actuating levers 18, are pivotally and independently mounted upon the ends of the rock shaft 14, so that when the latter is stationary the independent levers 18, may be moved to any desired adjusted position and secured in such position in the usual manner by engagement with the ratchet segments 17, the independent levers 18, leading downwardly and being suitably connected to the gangs 7, through the medium of gang lift rods or members 19. By reason of the construction just described, it will be apparent that the levers 18, and connected gangs 7, may be actuated and adjusted independently of each other while the master lever 16, and rock shaft 14, are secured in a stationary position, and that when the gang levers 18, are in engagement with the ratchet segment 17, said segments and levers and gangs will be simultaneously operated in unison with the rocking movements of the rock shaft 14, and master lever 16.

As a means of assisting or accelerating the upward simultaneous movements of the gangs through the operation of the master lever 16, as well as in a degree counterbalancing the weight of the cultivator gangs when the master lever is released from the segment 15ª, for the downward movement of the master lever by the hand of the operator, the seat beams 20, are transformed into a rocking or tilting seat lever by fulcruming the beams 20, over the axle supporting members 3, and extending the forward ends of the beams 20, over and above the rock shaft, the free ends of the beams 20, being pivotally connected to forwardly extending crank arms 21, mounted upon the rock shaft 14, it being obvious that by reason of the construction just described the weight of the rider or operator in the seat 22, will cause the crank arms 21, to move upwardly and assist in the actuation of the rock shaft 14, when the master lever 16, is released from the segment 15ª, and is caused to be moved downwardly in the act of elevating the gangs 7. The position of the seat 22, and beams 20, relating to the axle supporting members 3 of the cultivator frame may be regulated to a degree through the medium of notched fulcrum blocks 23, slidably mounted on and movable to and fro on the seat beams 20, and adapted to coöperate with the subjacent members 3, of the cultivator frame.

For convenience the seat beams or members 20, which are utilized as a rocking or tilting seat lever connected to one side of the rock shaft, are hereinafter referred to in the claims as a "seat lever" or a "seat beam," it being understood that such term shall include either a pair or plurality of seat beams forming such lever as shown, or a beam consisting of a single member.

From the foregoing description, taken in connection with the accompanying drawings, the operation and advantages of my invention will be readily understood.

Having thus described one of the embodiments of my invention, what I claim and desire to secure by Letters Patent, is,—

1. In a cultivator, a cultivator frame, a rock shaft provided with a fixed independently adjustable master lever adapted to rock and adjust said shaft, independent levers adjustably mounted on and adapted to be rocked with said shaft when the latter is rocked by said master lever, cultivator elements connected to said independent levers, and a rock shaft actuating seat lever adapted to counterbalance said cultivator elements.

2. In a cultivator, a cultivator frame, an adjustable rock shaft carrying master and independent levers, means for adjusting the latter independently of said master lever, and a seat carrying rocking lever connected to and movable with the actuation of said rock shaft and master lever.

3. A cultivator, comprising a cultivator frame, a rock shaft and lever carried thereby, ratchet segments and gang levers secured to and adapted to be rocked by said rock shaft, and a seat lever connected to and adapted to accelerate the actuation of said rock shaft when rocked by said rock shaft lever.

4. In a cultivator, a suitable cultivator frame, a transversely extending rock shaft mounted thereon, a master lever mounted on said rock shaft and adjustably mounted on said frame, gang levers adjustably mounted on said rock shaft, and a seat carrying lever connected to and adapted to move with the actuation of said rock shaft.

5. In a cultivator, the combination with a cultivator frame provided with a rock shaft carrying ratchet segments, and means for rocking and securing said rock shaft in various adjusted positions; of cultivator beams suitably carried beneath said cultivator frame, and independent cultivator beam actuating levers adapted to engage said ratchet segments and to be simultaneously moved with the actuation of said rock shaft.

6. In a cultivator, a cultivator frame, a rock shaft carried thereby, a master lever mounted on said shaft, a stationary ratchet segment securing said master lever and shaft in adjusted positions, ratchet segments mounted on and adapted to be rocked by said rock shaft, and independent levers adapted to engage said last mentioned ratchet segments and when so engaged to be simultaneously actuated by the rocking movements of said rock shaft.

7. In a cultivator, a cultivator frame provided with a transversely extending rock shaft and cultivator gangs, gang levers adjustably connected to and adapted to be actuated by said rock shaft, means for actuating and adjusting said rock shaft and said gang levers, and a seat carrying actuating lever connected to said rock shaft and adapted to counterbalance the weight of said cultivator gangs when the latter are being elevated through the simultaneous actuation of said rock shaft and gang levers.

8. In a cultivator, a frame provided with cultivator gangs, a rock shaft transversely mounted thereon and provided with ratchet segments, gang levers pivotally mounted on said rock shaft in coöperative relation to said segments and connected to said cultivator gangs, a master lever secured to said rock shaft, a stationary ratchet segment in coöperative relation to said master lever, and a seat carrying lever fulcrumed on said cultivator frame and pivotally connected to one side of said rock shaft whereby the actuation of said rock shaft in the elevation of said gangs is accelerated when moved by said master lever.

9. In a cultivator, a cultivator frame, cultivator gangs connected to and depending therefrom, a rock shaft transversely mounted thereon and provided with forwardly extending crank arms, ratchet segments mounted on and adapted to be rocked with said rock shaft, gang actuating levers pivotally mounted on said rock shaft and adapted to engage said ratchet segments, a master lever mounted on said rock shaft, a stationary ratchet segment in coöperative relation to said master lever, and seat carrying lever beams fulcrumed on said cultivator frame and pivotally connected to said crank arms of said rock shaft whereby to accelerate the movement of the latter when said lever is released from said coöperating ratchet segment for elevating said cultivator gangs by the movement of said rock shaft and gang levers.

In testimony whereof I have affixed my signature in presence of two witnesses.

FREDERICK C. WARNE.

Witnesses:
A. B. McLean,
C. A. Hines.

Copies of this patent may be obtained for five cents each, by addressing the "Commissioner of Patents, Washington, D. C."